United States Patent [19]
Severson et al.

[11] Patent Number: 5,911,388
[45] Date of Patent: Jun. 15, 1999

[54] ENVIRONMENTAL CONTROL SYSTEM WITH ENERGY RECOVERY AND BLEED AIR ASSIST

[75] Inventors: Mark Hamilton Severson; Steven Eric Squier, both of Rockford, Ill.

[73] Assignee: Sundstrand Corporation, Rockford, Ill.

[21] Appl. No.: 08/784,278

[22] Filed: Jan. 15, 1997

[51] Int. Cl.⁶ .............................. B64D 13/08; F25D 9/00
[52] U.S. Cl. ................ 244/118.5; 244/53 R; 244/134 R; 62/401; 62/402
[58] Field of Search .................. 62/401, 402; 244/118.5, 244/134 R, 53 R

[56] References Cited

U.S. PATENT DOCUMENTS

| | | |
|---|---|---|
| 2,327,737 | 8/1943 | Pendergast . |
| 2,328,489 | 8/1943 | Pfau . |
| 2,734,356 | 2/1956 | Klienhans . |
| 2,734,443 | 2/1956 | Wood . |
| 3,486,435 | 12/1969 | Holt . |
| 4,091,613 | 5/1978 | Young . |
| 4,312,191 | 1/1982 | Biagini ..................................... 62/402 |
| 4,665,973 | 5/1987 | Limberg et al. ...................... 244/118.5 |
| 4,684,081 | 8/1987 | Cronin . |
| 5,114,103 | 5/1992 | Coffinberry ........................... 244/118.5 |
| 5,125,597 | 6/1992 | Coffinberry ........................... 244/118.5 |
| 5,137,230 | 8/1992 | Coffinberry ........................... 244/118.5 |
| 5,214,935 | 6/1993 | Brunskill ................................... 62/402 |
| 5,299,763 | 4/1994 | Bescoby et al. ...................... 244/118.5 |
| 5,490,645 | 2/1996 | Woodhouse ........................... 244/118.5 |

*Primary Examiner*—Charles T. Jordan
*Assistant Examiner*—Charles R. Ducker, Jr.
*Attorney, Agent, or Firm*—Wood, Phillips, VanSanten, Clark & Mortimer

[57] ABSTRACT

The bleed air requirements for a pressurization and environmental control system for the cabin (10) of an aircraft may be reduced by a system that includes a turbomachine (20) having a rotary compressor (22) driven by a turbine wheel (26). A ram air inlet (16) is connected to the compressor inlet (28) and the aircraft is provided with a cabin air exhaust port (18) which is connected to the outlet (34) of the turbine wheel (26). A heat exchanger (40) has a cabin inlet air flow path (42) and a cabin outlet air flow path (44) in heat exchange with one another. The cabin inlet air flow path (42) is connected to the outlet (30) of the compressor (22) and to the cabin (10) of the aircraft. The cabin outlet air flow path (44) is connected to the cabin (10) as well as to the inlet (32) of the turbine (26). A bleed air inlet port (36), (70) is adapted to be connected to the bleed air tap (14) of a turbine engine (12) and is connected to one of the flow paths (42, 44, 52, 60) between the compressor outlet (30) and the turbine wheel inlet (32).

17 Claims, 2 Drawing Sheets

ENVIRONMENTAL CONTROL SYSTEM WITH ENERGY RECOVERY AND BLEED AIR ASSIST

FIELD OF THE INVENTION

This invention relates to an environmental control system for use on aircraft having pressurizable cabins to provide air pressure and temperature conditioning for occupants and equipment.

BACKGROUND OF THE INVENTION

As is well known, transport aircraft travelling at typical cruise altitudes require pressurization of their cabins as well as temperature conditioning of the air to maintain the comfort of the occupants and, in many instances, to provide a proper temperature operating level for onboard equipment. It is also known that the vast majority of modern day aircraft requiring such systems include fuel consuming, gas turbine engines, both for propulsion and for use as auxiliary power units.

In conventional pressurization systems, bleed air is extracted from the main propulsion engines to provide both the cabin ventilation air and the energy for cabin pressurization. Bleed air exits the engine compressor section at an elevated temperature and pressure and conventionally is cooled with so called "ram air" before it enters a compressor known as a cabin compressor. The cabin compressor elevates the pressure to still a higher level and, of course, there is a concomitant increase in air temperature.

This air is then typically cooled in a second ram air heat exchanger and cooled once again in the reheater by condenser outlet air before flowing through a system condenser whereat the bleed air is cooled below its dew point by the exhaust stream of a turbine employed to drive the cabin compressor.

Once the condensed moisture is removed, the air from the condenser is returned to a reheater where it's temperature is increased prior to entering the turbine. Energy is extracted at the turbine to lower the air temperature and pressure while generating the power to drive the cabin compressor. The air from the turbine outlet has heat rejected to it at the condenser and then flows to a mixing plenum just prior to distribution to the cabin.

Such a system typically relies on the use of main engine bleed air (although it may use bleed air from an auxiliary power unit in some instances) to provide all of the fresh air required by the cabin. As a consequence, the bleed air penalty is substantial and is the most significant operating expense for certain types of aircrafts such as Boeing 757 and 767 aircraft.

Moreover, as new turbine engine designs achieve even higher and higher bypass ratios, the penalties for bleed air extraction are even greater than for present day engines due to the further reduction in engine core air flow that is available to be utilized in part as bleed air. Accordingly, reduced dependence upon bleed air is a major design issue for modern aircraft because significant cost savings in operation can be realized. Even small bleed air savings are thought to result in significant operational cost savings.

The present invention is directed to reducing the quantity of bleed air required to operate a pressurization and environmental control system in an aircraft to achieve significant operational cost savings.

SUMMARY OF THE INVENTION

It is the principle object of the invention to provide a new and improved pressurization and environmental control system for use in aircraft. More specifically, it is an object of the invention to provide such a system wherein a substantial reduction in bleed air requirements is realized.

This object is realized in a pressurization and in environmental control system for an aircraft having a turbine engine which includes a turbomachine having a turbine wheel with an inlet and an outlet as well as a rotary compressor having an inlet and outlet which is driven by the turbine wheel. The system includes a ram air outlet connected to the compressor inlet and a cabin air exhaust port connected to the inlet of the turbine wheel. A heat exchanger has a cabin inlet air flow path and a cabin outlet air flow path in heat exchange relation with one another. The cabin inlet air flow path is connected to the outlet of the compressor and is adapted to be connected to the cabin of an aircraft. The cabin outlet air flow path is connected to the inlet of the turbine and is adapted to be connected to the cabin of an aircraft. The system, in general terms, is completed by a bleed inlet port adapted to be connected to a bleed air tap of a turbine engine of the aircraft. The bleed air inlet port is located in the flow paths between the compressor outlet and the turbine wheel inlet.

As a consequence of this construction, pressurized cabin exhaust air, after it has exited the cabin, is brought into heat exchange relation with higher temperature air received from the outlet of the compressor to cool the same to an appropriate value for admission of such air to the cabin. The exhaust air is also provided to the turbine to drive the same which in turn drives the compressor which compresses air to cabin pressure. As a result, the energy of the pressurized air from the cabin is recovered in the turbine. Losses in the system are made up by utilizing a minimum amount of bleed air which is introduced into the flow paths to assure sufficient pressurized air to drive the turbines to achieve the desired compression of ram inlet air by the compressor.

Various additions, modifications and refinements of the invention are also disclosed and other objects and advantages will become apparent from the following specification taken in connection with the accompanying drawings.

DESCRIPTION OF THE PREFERRED EMBODIMENTS

Figure 1:
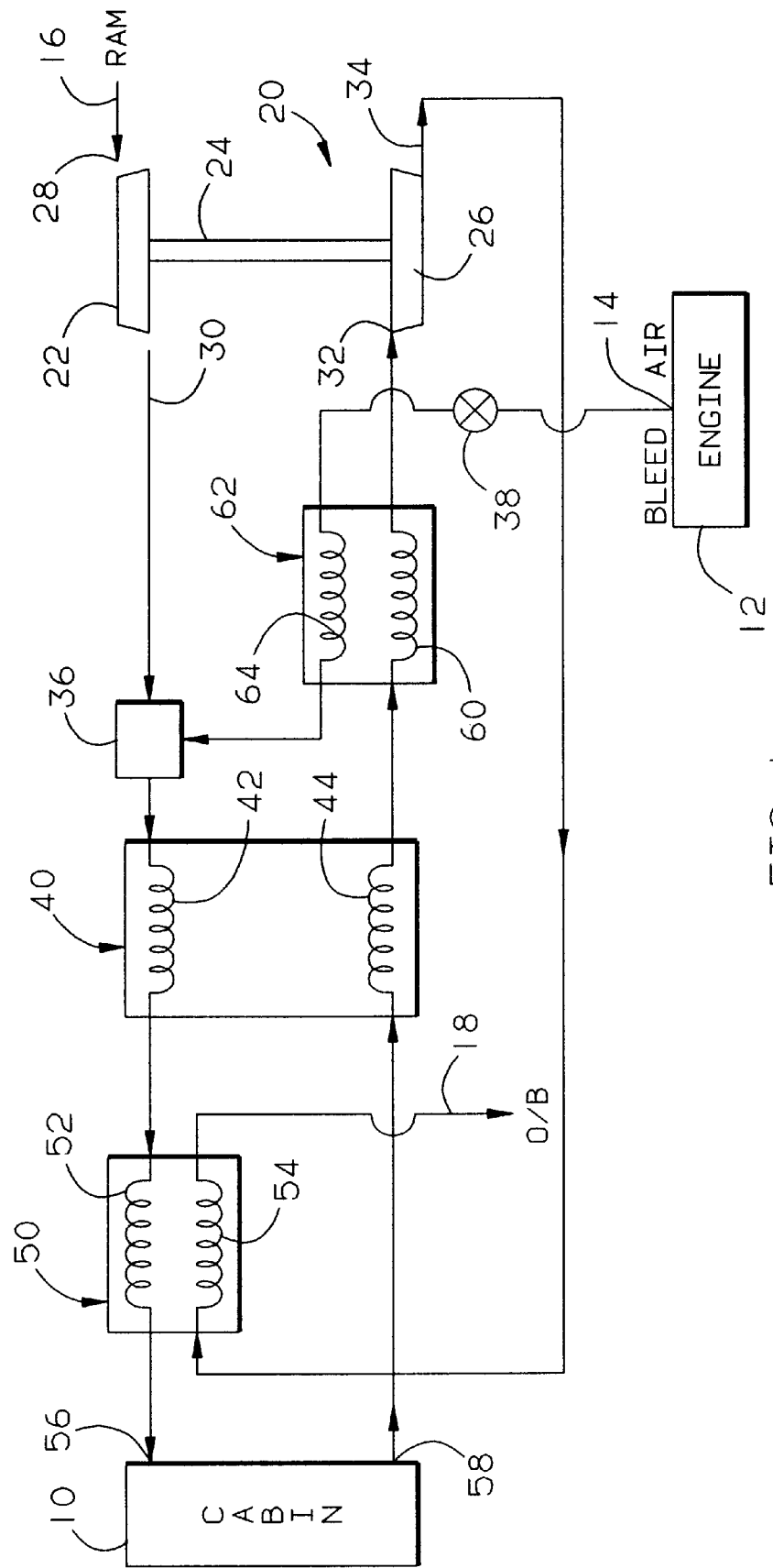
FIG. 1 is a schematic of one form of pressurization and environmental control stem made according to the invention.

An exemplary embodiment of a pressurization and environmental control system for the cabin of an aircraft is illustrated in FIG. 1 and with reference thereto is seen to include an aircraft that has a sealed cabin 10 which may be pressurized. The aircraft includes one or more fuel consuming, gas turbine engines 12, each of which is provided with a bleed air tap 14 as is well known. The engine 12 will typically be a main propulsion engine for the aircraft but in some instances may be the turbine engine forming part of an auxiliary power unit (APU).

The aircraft is provided with a conventional ram air inlet port 16 as well as the conventional exhaust port 18.

The system of the invention includes a turbomachine, generally designated 20, that includes a rotating compressor 22 connected by a shaft 24 to a turbine wheel 26. The compressor 22 includes an inlet 28 connected to the ram air inlet port as well as an outlet 30. The turbine wheel 26 likewise includes an inlet 32 and an outlet 34. Ram air from the port 16 is admitted to the aircraft and has it's pressure elevated by the compressor 22. As an incident to the compression, the temperature of the ram air will also be elevated.

The hot, compressed ram inlet air is conveyed from the compressor outlet 30 to a mixing plenum 36 where it is mixed with a relatively small quantity of bleed air ultimately received from the bleed air tap 14. The amount of bleed air admitted to the mixing plenum 36 may be controlled by a control valve 38 located downstream of the bleed air tap 14 and upstream of the plenum 36.

The system includes a primary regenerative heat exchanger, generally designated 40. The heat exchanger 40 has a cabin inlet air flow path 42 as well as a cabin outlet air flow path 44. The flow paths 42 and 44 are in heat exchange relationship with one another with the flow path 42 being connected to the plenum 36 and to the compressor outlet 30 while the flow path 44 is ultimately connected to the turbine inlet 32. Most of the energy recovered by the system is achieved in the heat exchanger 40. Here, incoming air from the compressor 22 is cooled while the exhaust air from the cabin 10 is heated prior to it's entry into the turbine wheel 26 to thereby increase the energy content of the exhaust air stream.

In a preferred form of the invention, a second heat exchanger, generally designated 50, is employed and includes a cabin inlet air flow path 52 in heat exchange relation with a flow path 54 for outlet air from the turbine 26. That is to say, the flow path 54 is connected to the outlet 34 of the turbine as well as to the exhaust port 18 whereat the exhaust air may be dumped overboard.

Returning to the cabin inlet air flow path 52 of the second heat exchanger 50, the same connects the cabin inlet air flow path 42 of the heat exchanger 40 to an inlet port 56 for the cabin. Air may exit the cabin through a port 58 connected to the cabin outlet air flow path 44 of the heat exchanger 40.

After exiting the heat exchanger 40, cabin exhaust air is provided to the cabin outlet air flow path 60 of a third heat exchanger, generally designated 62. The third heat exchanger 62 includes a bleed air inlet flow path 64 in heat exchange relation with the flow path 60 and which interconnects the control valve 38 and the plenum 36. The flow path 60 interconnects the flow path 44 and the turbine inlet 32.

Operation of the embodiment illustrated in FIG. 1 is generally as follows.

Inlet ram air is applied to the compressor 22 whereat it has it's pressure elevated to cabin pressure. It's temperature is also increased. The hot, pressurized ram air then proceeds to the plenum 36 where it is mixed with bleed air from the engine 12. It is to be noted that the temperature of the bleed air mixing with the compressor inlet air in the plenum 36 is at a reduced temperature by reason of it having rejected heat to the outlet air stream in the flow path 60 when passing through the third heat exchanger 62.

The combined inlet air/bleed air stream is then provided to the flow path 42 in the heat exchanger 40 whereat it is further cooled by cabin exhaust air passing through the flow path 44. Next, the inlet air/bleed air is further cooled in the flow path 52 within the second heat exchanger 50 and then provided to the cabin 10. Cooling within the heat exchanger 50 is as a result of the use of the turbine outlet stream as a cooling medium. As is well known, when a gas is expanded, as by the turbine wheel 26, not only is it's pressure lowered, but it's temperature is lowered as well. This lower temperature fluid stream is utilized within the second heat exchanger 50 to further cool the incoming air to the cabin to the desired temperature level.

After cooling the cabin, the air is exhausted from the cabin via the port 58 at cabin temperature. This temperature will be lower than the temperature of the incoming inlet air/bleed air stream and this condition is employed to cool the incoming inlet air/bleed air stream while heating the outlet or exhaust stream and increasing it's energy content.

From the flow path 44, the outlet stream passes through the flow path 60, where, as mentioned previously, it has heat rejected to it by the incoming bleed air stream from the bleed air tap 14. The energy content of the stream is thus increased further. The stream is then provided to the inlet 32 for the turbine wheel 26 and inasmuch as at typical altitudes, the cabin pressure will be substantially greater than the outside or ambient pressure, the turbine wheel 26 will be driven to drive the compressor 22 as the cabin air outlet stream expands within the turbine wheel 26. Cooling associated with such expansion is utilized to cool the incoming stream in the heat exchanger 50 as mentioned previously and then the stream is dumped overboard through the port 18.

As can be readily appreciated, a high degree of the energy in the cabin air stream is recovered both through heat exchange within the heat exchanger 40 and through expansion to perform useful work in driving the compressor 22 by the turbine 26. In this respect, the fact that heat is added to the exhaust stream by the heat exchangers 40 and 62 increases the amount of work that can be expected from the turbine 26.

Of course, there will be losses within the system due to flow constraints, friction, etc. However, these losses may be made up by admitting a relatively small quantity of bleed air from the bleed air tap 14 of the engine 12 into the system at the plenum 36. In this regard, it is considered that the system shown in FIG. 1 requires only 10%–20% of the bleed air mass flow rate of conventional systems and that the majority of the cabin air supply is provided by ram air from the port 16. That is to say, the bleed air admission to the system is regulated to provide only enough energy to overcome system losses. This results in significant energy savings in terms of the fuel consumed by the engine 12 with the most significant savings occurring at cruise altitude where the majority of flight occurs and where the largest penalty for bleed air extraction would normally be incurred.

It is also to be noted that the compressor mass flow rate is less than the turbine mass flow rate since the latter is based upon the total of bleed air and ram inlet air mass flows. As it happens, this is a favorable arrangement as the power requirements for the compressor 22 and the power generation capability of the turbine wheel 26 are proportional to the mass flow.

Figure 2:
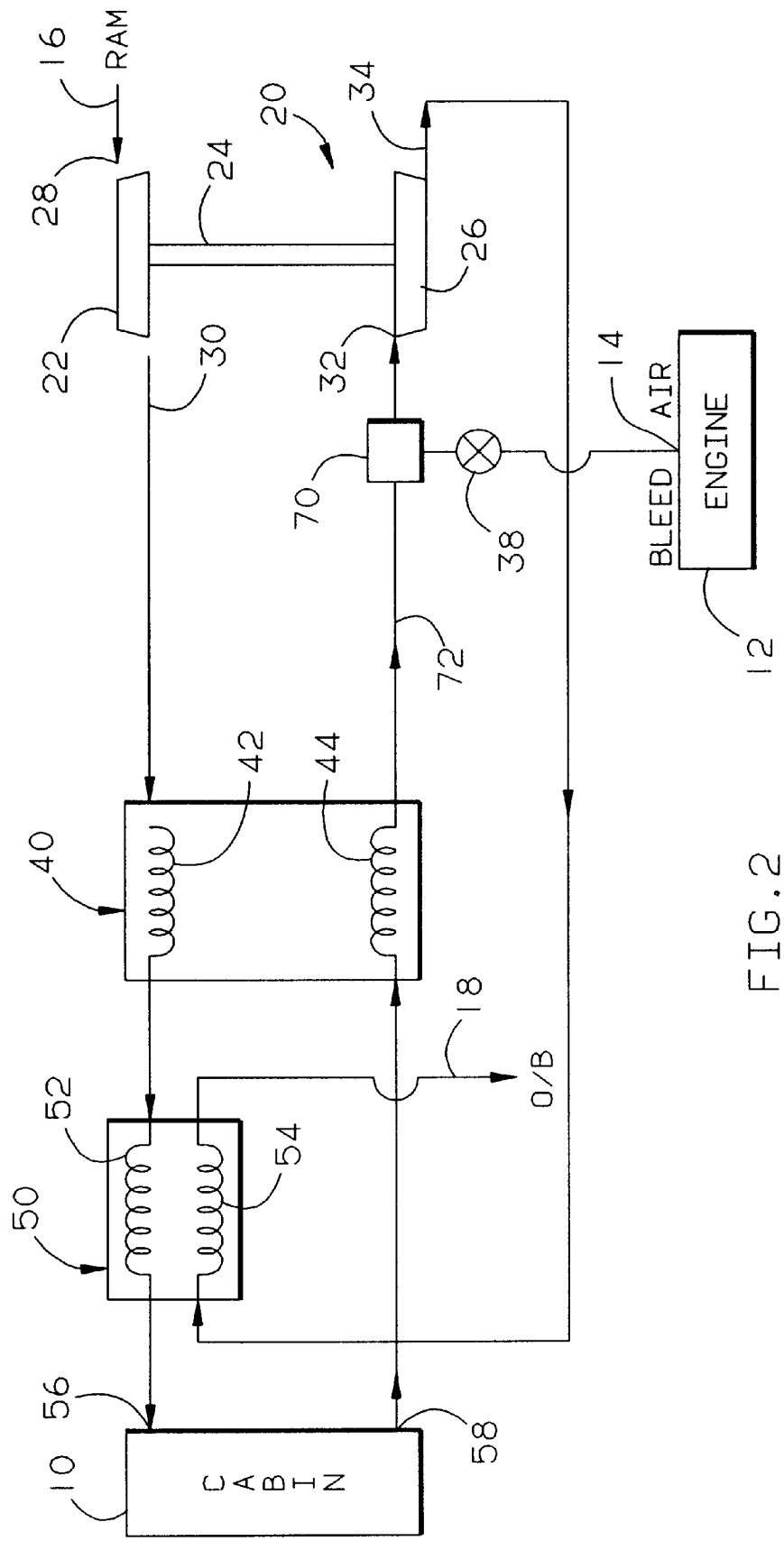
FIG. 2 is a schematic of a modified embodiment of the invention.

A modified embodiment is illustrated in FIG. 2 and where like components are employed, like reference numerals will be utilized and in the interest of brevity, will not be redescribed.

Basically, the difference between the embodiment illustrated in FIGS. 1 and 2 is that the latter omits the third heat exchanger 62 as well as the plenum 36. Instead, a plenum 70 connected via the control valve 38 to the bleed air tap 14 for the engine 12 is located in a duct 72 that directly connects the cabin outlet air flow path 44 of the principal heat exchanger 40 to the turbine wheel inlet 32. In this embodiment, the expense of the third heat exchanger 62 is eliminated while the energy added to the system by the heat of the bleed air is retained by it's introduction directly to the turbine wheel 26. At the same time, this embodiment utilizes more ram air because additional ram air is required to make up for the absence of bleed air in the cabin inlet air stream. This in turn requires that the turbomachine 20 be somewhat larger than in the previously described embodiment. It also means that there will be increased drag on the aircraft that is associated with an increase in the use of ram air.

In any event, it can be readily appreciated that a pressurization and environmental control system made according to the invention achieves substantial benefits in terms of providing a substantial reduction in bleed air requirements. As a consequence, operating efficiencies of modern day aircraft may be considerably improved.

What is claimed is:

1. An aircraft comprising:
    a sealable aircraft cabin;
    means for maintaining a desired pressure within said cabin, including means for providing fresh air to said cabin and means for dumping air from said cabin overboard;
    a rotatable turbine wheel associated with said dumping means such that air being dumped overboard is expanded to rotate said turbine wheels;
    a compressor having an outlet and connected to said turbine wheel for harnessing the rotation thereof;
    means for using air expanded from said turbine wheel for cooling purposes;
    a fuel consuming turbine engine;
    a bleed air tap for said engine, said bleed air tap being connected to said compressor outlet; and
    means in addition to said providing means and connected to said tap for introducing bleed air into one of said maintaining means and said turbine wheel.

2. The aircraft of claim 1 further including a first heat exchanger having one fluid flow path interconnecting said bleed air tap and said compressor outlet and another fluid flow path in heat exchange relation with said one fluid flow path and located in said dumping means between said cabin and an inlet to said turbine wheel.

3. The aircraft of claim 2 further including a second heat exchanger having first and second fluid flow paths in heat exchange relation with each other; said first fluid flow path receiving a first fluid to be cooled and said second fluid flow path receiving expanded air from said turbine wheel to cool said first fluid;
    said second fluid flow path being connected to a dump port exterior of said cabin and constituting said dumping means;
    said second heat exchanger comprising said using means.

4. The aircraft of claim 3 further including a third heat exchanger including a fluid flow path interconnecting said compressor outlet and said first fluid flow path and an additional fluid flow path in heat exchange relation therewith and interconnecting said cabin and said another fluid flow path; said third heat exchanger comprising said using means.

5. The aircraft of claim 1 wherein said bleed air introducing means is connected to an inlet to said turbine wheel.

6. A pressurization system for the cabin of a turbine engine equipped aircraft comprising:
    a turbomachine including a turbine wheel and a rotating compressor connected thereto;
    a ram air port for the aircraft and connected to an inlet of the compressor;
    an exhaust port for the aircraft and connected to the outlet to the turbine wheel;
    a first heat exchanger having an exhaust air flow path in heat exchange relation with a cabin air flow path, said exhaust air flow path being located between said exhaust port and said turbine wheel outlet, said cabin air flow path being adapted to be connected to the aircraft cabin;
    a bleed air inlet for said system and adapted to be connected to a bleed air tap on the turbine engine and to an inlet for the turbine wheel; and
    a second heat exchanger having a cabin air flow path in heat exchange relation with an exhaust air flow path, said second heat exchanger cabin air flow path be connected between an outlet of said compressor and said first heat exchanger cabin air flow path, said second heat exchanger exhaust air flow path having a connection to the inlet of said turbine wheel and being adapted to be connected to said cabin.

7. The pressurization system of claim 6 further including a third heat exchanger having an exhaust air flow path interconnecting the inlet to the turbine wheel and said second heat exchanger exhaust air flow path and in heat exchange relation with a bleed air flow path, said bleed air flow path connecting said bleed air inlet to the outlet of said compressor so that said bleed air inlet is connected to the inlet of said turbine wheel by both said cabin air flow paths, said cabin and both said exhaust air flow paths.

8. The pressurization system of claim 6 wherein said bleed air inlet is connected to the inlet of said turbine wheel by a connection to said connection of said second heat exchanger exhaust air flow path to said turbine wheel inlet.

9. A pressurization and environmental control system for an aircraft having a turbine wheel engine comprising:
    a turbomachine including a turbine wheel having an inlet and an outlet and a rotating compressor having an inlet and an outlet and driven by the turbine wheel;
    a ram air inlet port for said compressor and connected to said compressor inlet;
    a cabin air exhaust port connected to the outlet of said turbine wheel;
    a heat exchanger having a cabin inlet air flow path and a cabin outlet air flow path in heat exchange relation with one another, said cabin inlet air flow path being connected to the outlet of said compressor and being adapted to be connected to the cabin of an aircraft, said cabin outlet air flow path being connected to the inlet of said turbine and adapted to be connected to the cabin of an aircraft; and
    a bleed air inlet port adapted to be connected to a bleed air tap of the turbine engine, said bleed air inlet port being connected to one of said flow paths between the compressor outlet and the turbine wheel inlet.

10. The pressurization and environmental control system of claim 9 wherein said bleed air inlet port is located between said compressor outlet and said cabin air inlet flow path.

11. The pressurization and environmental control system of claim 10 further including an additional heat exchanger having a bleed air inlet flow path and a cabin outlet air flow path in heat exchange relation therewith, said bleed air inlet port being adapted to be connected to said bleed air tap via said bleed air inlet flow path, said additional heat exchanger cabin outlet air flow path being connected between said first-named heat exchanger cabin outlet air flow path and said turbine wheel inlet.

12. The pressurization and environmental control system of claim 9 further including an additional heat exchanger having a cabin inlet air flow path and a turbine wheel outlet air flow path in heat exchange relation with each other, said turbine wheel outlet air flow path being connected between said turbine wheel outlet and said cabin air exhaust port, said additional heat exchanger cabin inlet air flow path being adapted to be connected to the cabin of an aircraft and to the outlet of said compressor.

13. The pressurization and environmental control system of claim 12 wherein said additional heat exchanger cabin inlet air flow path is connected to the outlet of said compressor via the cabin inlet air flow path of said first named heat exchanger.

14. The pressurization and environmental control system of claim 13 wherein said bleed air inlet port is located between said compressor outlet and said cabin air inlet flow path of said first named heat exchanger.

15. The pressurization and environmental control system of claim 14 further including an additional heat exchanger having a bleed air inlet flow path and a cabin outlet air flow path in heat exchange relation therewith, said bleed air inlet port being adapted to be connected to said bleed air tap via said bleed air inlet flow path, said additional heat exchanger cabin outlet air flow path being connected between said first-named heat exchanger cabin outlet air flow path and said turbine wheel inlet.

16. The pressurization and environmental control system of claim 9 wherein said bleed air inlet port is located between said turbine wheel inlet and said cabin outlet air flow path.

17. The pressurization and environmental control system of claim 10 further including means for controlling the flow of bleed air into said bleed air inlet port.

* * * * *